United States Patent Office 3,298,941
Patented Jan. 17, 1967

3,298,941
PHOTOCHEMICAL PROCESS FOR REARRANGING ORGANIC HYPOHALITE AND NITRITE COMPOUNDS
Derek H. R. Barton, Northwood, England, assignor to Schering Corporation, Bloomfield, N.J., a corporation of New Jersey
No Drawing. Filed May 29, 1961, Ser. No. 113,086
16 Claims. (Cl. 204—158)

The present invention is a continuation-in-part of the copending application of Derek H. R. Barton, Serial No. 95,490, filed March 14, 1961, now U.S. Patent No. 3,215,713, which, in turn, is a continuation-in-part of application Serial No. 19,444, filed April 4, 1960, now abandoned.

The present invention relates to a new photolytic process and to new compounds for use in such a process. More particularly it relates to a novel and improved process for attaching substituents to the 18 to 29 carbon steroids and to other organic compounds.

The present invention has for its object the provision of a novel and improved process by which various substituents may be attached to different and selected portions of the molecule of certain organic compounds, which organic compounds are selected from the group of alcohols having a first carbon atom to which the —OH group is attached, a carbon atom adjacent said first carbon atom, another atom spaced from said first carbon atom by said adjacent carbon atom, and attached to said other atom another carbon atom to which at least one hydrogen atom is attached, said other atom being selected from the group consisting of O, S, N, and C. This group of alcohols may be symbolized by HO-C-C-X-C-H, wherein X is C, O, N, and S, said group of alcohols being further characterized by being selected from the group consisting of the heterocyclic, alicyclic (including steroids) and other cyclic alcohols, and those other alcohols which have in addition to the hydroxyl group, at least six carbon atoms and another atom selected from the group consisting of O, S, N, and C. As used hereinafter, the expression "HO-C-C-X-C-H alcohols" is used to include those alcohols which are comprised within the foregoing definition.

A further object of the present invention is the provision of a novel and improved process of photolysis which is applicable to solutions of derivatives YO-C-C-X-C-H of such HO-C-C-X-C-H alcohols wherein Y is a member of the group consisting of halogen, NO, and OR, R being a member of the group consisting of alkyl, aralkyl, heteroalkyl, acyl, sulphonyl, sulphate, phosphate and a borate acid residue. Of the aforementioned, the preferred mode of my inventive process is the photolysis of solutions of nitrite esters of said HO-C-C-X-C-H alcohols.

The invention further provides a novel and improved process of forming many new organic compounds, many of which are new and useful in themselves, while others of the resulting compounds are steroids useful as intermediates in the production of different steroids and other organic compounds many of which have medicinal value. In many instances, the process of the present invention makes it possible to form substituted compounds which cannot be formed by conventional processes, while in other instances, the process of the present invention provides a simpler, more expedient and more economical process of forming such substituted organic compounds.

A further object of the present invention, in certain of its aspects, is the provision of a novel and highly useful series of new compounds, the nitrite esters of steroids having from 18 to 29 carbon atoms, which are characterized by being photochemically active, and by having the nitrite radical in the $1\beta$, $2\beta$, $4\beta$, $6\beta$, $7\beta$, $11\alpha$, $11\beta$, $15\alpha$, 18, 19, $20\alpha$, $20\beta$, or 24 position. Such nitrite steroid esters provide a series of compounds which are extremely useful as intermediates and may be photolytically reacted to produce oximes, nitroso-monomers and nitroso-dimers and in some instances, by further chemical change, nitrones.

Another novel, useful series of new compounds provided by this invention are the hypochlorite esters of steroids having from 18 to 29 carbon atoms, which are useful as intermediates and may be photolytically reacted to produce chlorohydrins, which upon alkaline treatment yield the corresponding oxides. The aforementioned oxides may in certain instances, be oxidized with chromic acid, for example, to a lactone. Typical hypochlorite esters of this invention are the hypochlorites of $3\beta$-acetoxy-20-methylallopregnane - 20 - ol, $3\beta$ - acetoxy - $6\alpha$ - methylcholestan - $6\beta$ - ol, and the like.

In the process of the present invention there is first formed the derivative, YO-C-C-X-C-H as heretofore defined, after which the derivative is dissolved in a suitable solvent and subjected to ultraviolet radiation containing at least some of the absorption bands of the YO radical in the YO-C-C-X-C-H. The activation of the YO radical causes the "Y" group to be transferred from the carbon atom to which it is linked to a conformationally adjacent carbon atom; the resultant chemical change is the exchange of the "Y" group with a H atom originally attached to the conformationally adjacent carbon atom, the latter carbon atom and the carbon atom linked to the OY radical being separated by a —C—X— group wherein X is C, O, S, or N. The preferred mode of my invention, i.e., the photolysis of nitrite esters, is described in detail hereinbelow.

In the process of the present invention, there is first formed the nitrite ester of a HO-C-C-X-C-H alcohol, as by reacting such an alcohol with nitrosyl chloride in a dry nonpolar solvent, such as pyridine, after which the nitrite ester is subjected to ultraviolet radiation of a wave length band from about 2000 A. to 5000 A. while the nitrite ester is dissolved in a suitable solvent. The wave lengths of the irradiation band are such that it includes activating energy, and the wave length of the ultraviolet light corresponds to at least some of the absorption bands of the nitrite radical. This activation of the nitrite radical causes the NO group to be transferred from the carbon atom to which it is linked to a conformationally adjacent carbon atom; the resultant chemical change is that the NO group is exchanged with an H atom originally attached to this conformationally adjacent carbon atom. The latter carbon atom is separated from the carbon atom to which the nitrite radical is linked by two intervening carbon atoms or by a —C—X— group wherein X is C, O, S, or N. Thus, by irradiation and photolysis, the nitrite is transformed by rearrangement of the molecule into an oxime, a nitroso-dimer, or a nitroso-monomer, and occasionally if other functional groups are suitably placed, to a smaller extent to a nitrone. The oxime, nitroso-monomer and the nitroso-dimer, as well as any nitrone which is formed, may then be further reacted to form other organic compounds, such as lactones, hemi-acetals, nitriles, alcohols, aldehydes, ketones, amines, carboxylic acids, iminolactones, and many other derivatives.

The process of the present invention involves the photolytic exchange of a hydrogen atom and a NO group within the molecule of an HO-C-C-X-C-H alcohol, the interchange being effected between the NO group and a hydrogen which are linked to separate carbon atoms, which carbon atoms are spaced from each other by two other atoms one of which is carbon while the other is oxygen, sulfur, nitrogen or carbon, the hetero-atom being more distant from the —OH group than the others of the two spacing atoms. With such an arrangement of the NO group and a hydrogen atom attached to separate carbon atoms within the molecule subjected to ultra-violet radiation of a wave band including ultra-violet energy of wave lengths corresponding to at least some of the absorption bands of the nitrite radical, the nitrite radical is activated and, when the nitrite ester is in solution, it reacts with the conformationally adjacent hydrogen atom to produce a new compound, such as a nitroso-dimer, nitroso-monomer, or an oxime thereby providing a new group of intermediates for the production of many new or difficulty obtainable end products.

As will be seen by reference to the summary in Fieser and Fieser, "Steroids" (1959), pp. 7 to 15, and the works there referred to, the atoms attached to the $11\beta$ and 18 carbon atoms of the steroid molecule are more adjacent to each other than the $11\beta$ substituents are to the hydrogen atoms attached to carbon atoms at positions 8, 9, 12 or 13. Similarly, the substituents on the $11\beta$ are closer to the hydrogen atoms on the 19-carbon atom, than they are to the other hydrogen atoms attached to carbon atoms surrounding the 19-carbon position, that is to the hydrogen atoms attached to carbon atoms at positions 1, 5, 6, or 9.

In a similar manner, the atoms and groups linked to other carbon atoms in the steroid molecule, are conformationally adjacent to the hydrogen atoms linked to certain other carbon atoms, of which the following are the principal examples:

$1\beta$ group is conformationally adjacent to hydrogen attached to 11-carbon;
$2\beta$ group is conformationally adjacent to hydrogen attached to 19-carbon;
$4\beta$ group is conformationally adjacent to hydrogen attached to 19-carbon;
$6\beta$ group is conformationally adjacent to hydrogen attached to 19-carbon;
$7\beta$ group is conformationally adjacent to hydrogen attached to 15-carbon;
$11\beta$ group is conformationally adjacent to hydrogen attached to 18- and 19-carbons;
$11\alpha$ group is conformationally adjacent to hydrogen attached to 1-carbon;
$15\alpha$ group is conformationally adjacent to hydrogen attached to 7-carbon;
18 group is conformationally adjacent to hydrogen attached to 11-carbon;
19 group is conformationally adjacent to hydrogen attached to 11-carbon;
$20\alpha$ and $20\beta$ groups are conformationally adjacent to hydrogen attached to 18-carbon;
24 group is conformationally adjacent to hydrogen attached to 20-carbon.

In less complex compounds to be conformationally adjacent, it is usually only necessary that the photolytically active nitrite group be linked to a carbon atom of a compound having the grouping ONO-C-C-X-CH, such as 1-octanol-nitrite (1-octyl nitrite), and the carbon holding the reactive hydrogen to be exchanged with the NO group will be found to be spaced from the carbon atom to which the NO group is attached by two intervening carbon atoms or by two atoms —C—X— wherein X is O, N, or S, provided the carbon possessing the reactive hydrogen is saturated. Thus, in the case of 1-octyl nitrite, irradiation of the compound in a suitable solvent, will cause the NO group, at the 1-position, to be exchanged with a hydrogen attached to the 4-position. Similarly, an NO group attached to the 2-carbon in the nitrite ester of 2-octyl alcohol will react with a hydrogen atom attached to the 5-carbon atom.

After the process has been carried out, as by the formation of oxime at the 4-position from a nitrite ester having the nitrite group in the 1-position, the oxime may be converted to the corresponding alcohol, giving a 1,4-diol, which may then be re-esterified to yield the 4-nitrite ester, which may then be subjected to further photolysis in solution to yield the oxime at the 7-position, which 7-oximino compound may then be converted into the desired final product, such as a 1,4,7-triol.

The mechanism by which this photolytic rearrangement and exchange takes place is imperfectly understood at the present time, but the following model and explanation is offered, which is consistent with the facts known at the present time.

A primary, secondary, tertiary, normal or branched chain nitrite, derived from an HO-C-C-X-C-H alcohol, represented by the general formula (1) below, and illustratively having eight carbon atoms in the molecule, is subjected to ultra-violet irradiation of a wave-band having wave-lengths in the general range of 3000 A. to 5000 A., and preferably intense bands of radiation between 3400 A. and 4000 A., which correspond to at least some of the ultra-violet absorption bands of the nitrite radical, in the solvent being used, whereupon, the NO group bonded as shown in Formula 2, is freed from the oxygen atom linking it to its original carbon atom in the molecule. The hydrogen atom on the fourth carbon atom (that is the carbon atom which is separated by two carbon atoms from the carbon atom to which the nitrite group is attached) is attacked by and thence held by the ultra-violet activated oxygen radical generated by release of the NO group as shown in Formula 3. The next stage is thought to comprise the migration of the NO group to the carbon group from which the hydrogen was just released as shown in Formula 4, and which may exist as a monomer or dimer depending on the structure of the compound, and where $R_1$ or $R_2$ in the Formulae 1, 2, 3, and 4, or both of them is hydrogen, the reaction proceeds under prototropic conditions (preferably in a lower alkanol solution at reflux temperature) to the formation of the oxime (5), after which removal of one molecule of water will result in the formation of a nitrile (6) (if $R_2$ is hydrogen).

As applied to aromatic and other aryl compounds the nitrite radical, as in (7), by photolysis is rearranged to form a nitroso-dimer compound, such as in (8a) which converts under prototropic conditions to the more stable isomer, the oxime (8b).

With alicyclic compounds, the nitrite group may be attached to a carbon in the ring, as at (9), and react with an available hydrogen separated from the nitrite radical by four carbon atoms, that is by two carbon atoms intervening between the carbon atoms to which the nitrite radical and reactive hydrogen are attached to give a compound such as (10a) and the isomeric oxime (10b); or, in an aromatic compound, the nitrite radical in the side chain (11) may react with a hydrogen bonded to a carbon atom in another side chain to yield (12a) and (12b).

Similarly, in the heterosubstituted compounds, the nitrite radical (in compound 13) is activated by irradiation to exchange its NO group with a hydrogen suitably spaced from the nitrite-bonded carbon atom, to give the compound shown at (14).

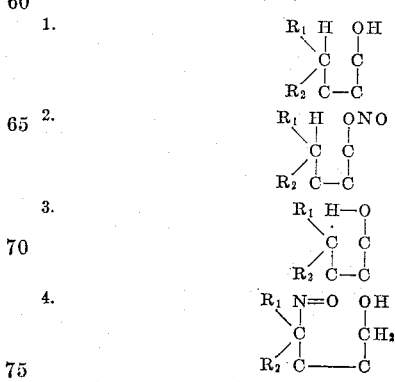

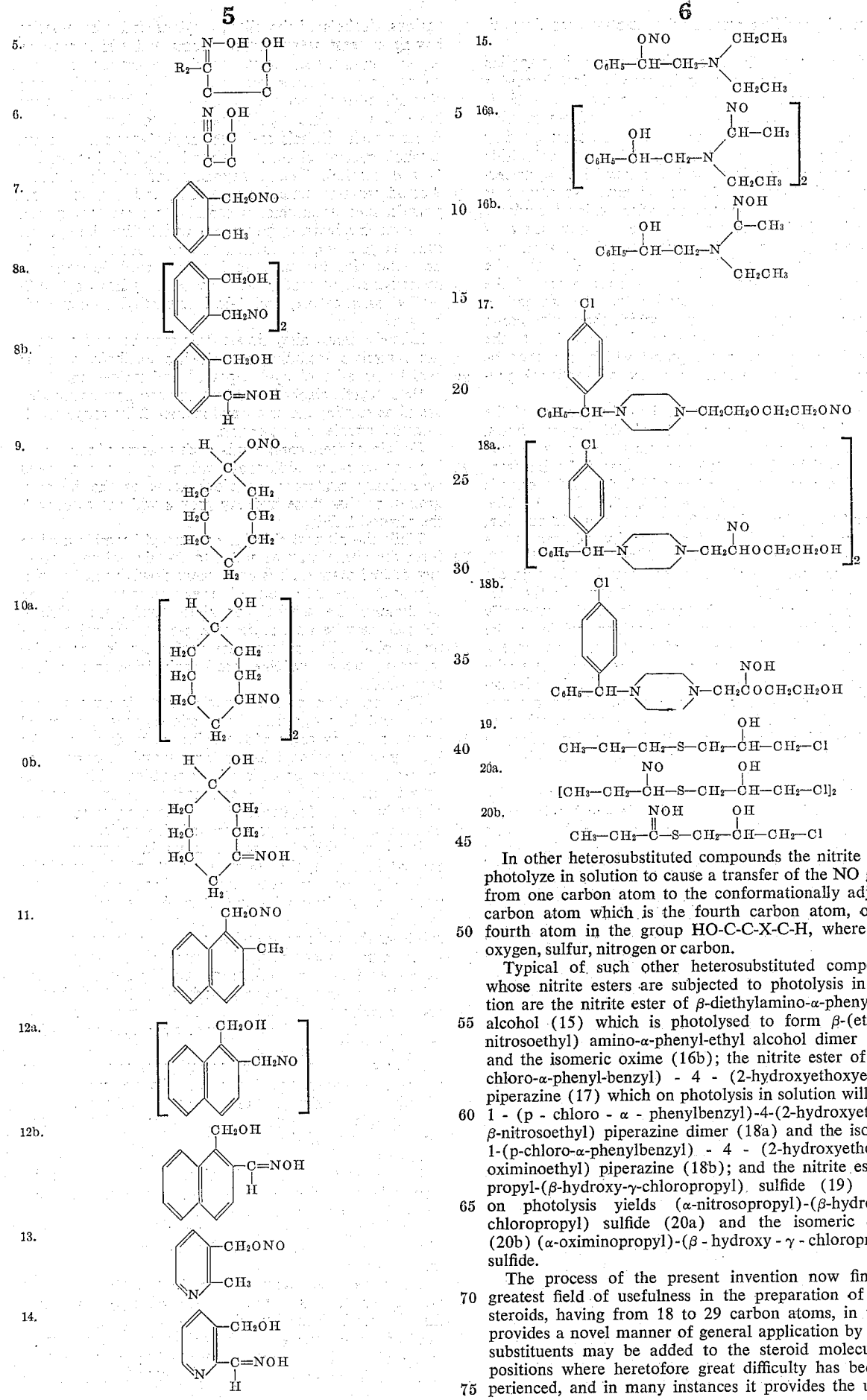

In other heterosubstituted compounds the nitrite esters photolyze in solution to cause a transfer of the NO group from one carbon atom to the conformationally adjacent carbon atom which is the fourth carbon atom, or the fourth atom in the group HO-C-C-X-C-H, where X is oxygen, sulfur, nitrogen or carbon.

Typical of such other heterosubstituted compounds whose nitrite esters are subjected to photolysis in solution are the nitrite ester of β-diethylamino-α-phenylethyl alcohol (15) which is photolysed to form β-(ethyl-α-nitrosoethyl) amino-α-phenyl-ethyl alcohol dimer (16a) and the isomeric oxime (16b); the nitrite ester of 1-(p-chloro-α-phenyl-benzyl) - 4 - (2-hydroxyethoxyethyl)-piperazine (17) which on photolysis in solution will yield 1 - (p - chloro - α - phenylbenzyl)-4-(2-hydroxyethoxy-β-nitrosoethyl) piperazine dimer (18a) and the isomeric 1-(p-chloro-α-phenylbenzyl) - 4 - (2-hydroxyethoxy-β-oximinoethyl) piperazine (18b); and the nitrite ester of propyl-(β-hydroxy-γ-chloropropyl) sulfide (19) which on photolysis yields (α-nitrosopropyl)-(β-hydroxy-γ-chloropropyl) sulfide (20a) and the isomeric oxime (20b) (α-oximinopropyl)-(β - hydroxy - γ - chloropropyl) sulfide.

The process of the present invention now finds its greatest field of usefulness in the preparation of novel steroids, having from 18 to 29 carbon atoms, in that it provides a novel manner of general application by which substituents may be added to the steroid molecule, in positions where heretofore great difficulty has been experienced, and in many instances it provides the unique manner of providing certain substituents at certain positions.

In the process of the present invention, as it is applied to the 18 to 29 carbon steroids, there is first formed a nitrite ester having a nitrite radical in the 1, 2, 4, 5, 6, 7, 11, 15, 18, 19, 20 or 24 position, by reacting a solution of a steroid having a hydroxy group at the corresponding position in pyridine, dimethylformamide, acetic anhydride or other non-polar solvent with a nitrosyl halide, preferably nitrosyl chloride. The steroid nitrite so formed is then subjected to ultraviolet radiation which includes a band of radiation corresponding to at least some of the absorption bands of the nitrite radical. This irradiation causes the nitrite radical to be activated so that the NO group is transferred from a carbon atom of the steroid molecule to a conformationally adjacent carbon atom spaced from the carbon to which the nitrite group is linked by two carbon atoms (as from the 11β to the 18 position), to form a compound which may then be further reacted in various ways by conventional procedures.

Many of the nitrite esters used in the process of the present invention are new and valuable intermediates, and the invention thus also comprises such novel nitrite esters, especially the nitrite esters of steroids having from 18 to 29 carbon atoms, and in which the nitrite ester is in the 1β, 2β, 4β, 6β, 7β, 11α, 11β, 15α, 18β, 19β, 20α, 20β, or 24 position. In the 2β, 4β, 6β, and 11β position, the nitrite radical is conformationally adjacent to a hydrogen attached at the 19 position. In the 1β, 18, and 19 positions, the nitrite is conformationally adjacent to a hydrogen attached to the 11 position. In the 11β, 20α and 20β positions, the nitrite is conformationally adjacent a hydrogen in the 18 position, while in the 11α-position, the nitrite is conformationally adjacent a hydrogen in the 1-position; in the 7β-position, the nitrite is conformationally adjacent a hydrogen in the 15-position; in the 15α-position, the nitrite radical is conformationally adjacent a hydrogen in the 7-position, while in the 24 position the nitrite radical is conformationally adjacent a hydrogen in the 20 position of a steroid having from 24 to 29 carbon atoms.

The 18 to 29 carbon steroid nitrites of the present invention thus form a group of valuable and highly useful intermediates for the production of both known and hitherto unknown steroids, while the process of the present invention provides a novel method by which a variety of substituent groups may be introduced at many different positions, including the 11, 18, 19 and 20 positions into a steroid molecule having 18 to 29 carbon atoms, thereby providing a series of intermediates which serve for the formation of other compounds, many of which have heretofore been difficult to prepare, while others have been unknown and cannot be made by known or conventional processes.

Among the types of organic compounds which can be usefully employed as starting materials in the process of the present invention are the 18- to 29-carbon steroids having a hydroxy group, such as 11β-hydroxyestrone, 11β-hydroxy-Δ⁴-androstene-3,17 - dione, 11β - hydroxytestosterone-17-acetate, 11β-hydroxyisoandrosterone-3-acetate, cortisol acetate, corticosterone acetate, 16α-hydroxycorticosterone acetate, 16α-methyl corticosterone acetate, 16β-methylcorticosterone acetate, 16α-hydroxy-1-dehydrocorticosterone acetate, 16α-methyl-1-dehydrocorticosterone acetate, 16β-methyl-1-dehydrocorticosterone aceate, pregnane-3α-11β-17α,20β-tetrol-3,20 diacetate, prednisolone acetate, 11β-hydroxyprogesterone acetate, 11β-17α-dihydroxyprogesterone, 16α-hydroxyprednisolone acetate, 16α-methylprednisolone acetate, 16β-methylprednisolone acetate, dexamethasone acetate, 16-epidexamethasone acetate (Δ¹,⁴-pregnadiene-3,20-dione-9α-fluoro-11β,17α,21-triol-16β-methyl 21 acetate), pregnane-3α,11β-20-triol 3α, 20-diacetate and 11β-hydroxy cholestanol acetate.

Other compounds useful as starting materials are the various alcohols of the alkyl, alkylene and alkyne series having at least seven carbon atoms and which may be either primary, secondary, branched chain, or other alcohols of these series, and may include the polyhydric alcohols after all but one of the reactive hydroxy groups have been blocked against reaction to form a nitrite. Among such alcohols are 1-heptanol, 1-octanol, 1-lauryl alcohol, n-cetyl alcohol, n-stearyl alcohol, heptanol-4, 2-octyl alcohol, 2-ethyl hexanol, undecylenic alcohol, 9-octadecen-1-ol, undecynic alcohol, and hydroxy compounds, such as antibiotics containing a hydroxy group, or in which a hydroxy group may be introduced, terpenes, such as geraniol, citronellol, and methanol, vitamin A, aromatic alcohols such as 2-hydroxymethyltoluene, 1-hydroxymethyl-2-methyl anthracene, 1-hydroxymethyl-2-methyl naphthalene, and 1-hydroxymethyl-2,4-dimethylbenzene.

Likewise many alicyclic alcohols may be used as starting materials including monohydric alcohols, such as cyclohexaneethanol, cycloheptanol, and cyclooctanol.

Heterocyclic alcohols and hydroxy compounds are also useful as starting materials and include 2-hydroxymethyl-3-methylpyrrole and reserpine.

Certain of these compounds, such as some of those having one or more additional hydroxy groups, may need preliminary protection to block some of the hydroxy groups, so that these hydroxy groups will not react with the nitrosyl halide.

While the nitrosyl chloride or nitrosyl bromide used to form the nitrite may be added to the alcohol solution in any desired manner, it is convenient slowly to add a solution of the nitrosyl chloride in the same solvent as is used to dissolve the alcohol, or alternatively, the nitrosyl chloride may be introduced as a gas into the solution of the alcohol. The solvents are preferably dry non-polar solvents, such as pyridine, acetic anhydride or dimethylformamide.

The formation of the organic nitrite is usually very rapid, and the progress of the reaction is usually observed by the resulting color of the solution, so that when the blue green or other color of the nitrosyl chloride is no longer discharged or changed by reaction with the dissolved alcohol, it can be assumed in general that the nitrite has been formed and that the compound in the solution is ready for separation and photolysis.

In the majority of the reactions within the scope of the present invention, the temperature at which the nitrite is formed is not subject to any critical range but the reactions are usually carried out at moderate temperatures, ranging from −30° to 30° C., although in certain of the reactions the yield varies when there is a departure from an optimum temperature. In general satisfactory results have been found to result from carrying out the nitrosyl chloride reactions in the neighborhood of 0° C. to 30° C. and generally at 15° C. to 20° C., although the reaction will proceed over a wide temperature range, such as −30° C. to +30° C.

After completion of the formation of the nitrite, the nitrite is separated, and this is generally accomplished by adding water to the solution to precipitate the nitrite and by subsequent filtering, followed by crystallization, and recrystallization if desired, or otherwise if the nitrite is a liquid.

Thereafter, the nitrite is dissolved in a solvent preparatory to being subjected to photolysis by ultraviolet light, although a liquid or solid nitrite ester of this invention may be photolysed per se and there will occur a transfer of the NO group with said active hydrogen according to this invention.

The ultraviolet radiation used to activate the nitrite radical so as to cause it to be transferred in part to replace the adjacent hydrogen attached to a carbon atom, is that band of radiant energy which corresponds to some or all of the ultraviolet absorption bands of the nitrite radical and is in the range from 3000 A. to 5000 A. and usually at 3400 A. to 4000 A. Such energy is conveniently supplied by a Hanovia high-pressure mercury arc lamp with a Pyrex sleeve in proximity thereto, while the nitrite to be reacted is contained in an ultraviolet transmitting receptacle, such as a water-cooled Vycor immersion well.

A variety of solvents may be used for the photolysis of the nitrite, including acetic acid, acetone, acetonitrile, benzene, carbon disulfide, carbon tetrachloride, chlorobenzene, chloroform, cyclohexane, dimethyl ether, dimethylformamide, dioxane, ethyl acetate, Freon 113, heptane, methylene chloride, and toluene, of these benzene and Freon 113 yield preferred results and toluene is the most preferred. For efficient operation, the solvent is preferably chosen so as to have a high degree of transparency to ultraviolet radiation within the specified band of nitrite absorption.

While the solvents used in the photolysis are ordinarily water-free, a small amount of moisture in the solvent used for photolysis does not ordinarily interfere with the progress of the ultraviolet activation and rearrangement of the nitrite in accordance with the present invention.

During the course of the photolysis of a nitrite ester, a stream of nitrogen or other inert gas is generally bubbled through the solution, but it is not always necessary to keep the nitrite solution protected by an inert atmosphere.

The photolysis of the nitrite ester which is carried on by irradiation with the selected band of ultraviolet radiation is monitored from time to time by infra-red spectrophotometry of an aliquot, and the reaction is complete when the infra-red absorption spectra lack the characteristic spectra of the nitrite grouping.

The products of the nitrite photolysis are variously treated, and such subsequent steps may include chromatography, fractional crystallization, and by further reactions to convert the photolysed nitrite ester into a nitrile, iminolactone, lactone, hemiacetal, alcohol, carboxylic acid, or otherwise.

Among the various ultimate products which may be prepared from the steroid nitrites by the process of the present invention, with added conventional steps, are the lactones, linked at 2 and 19, at 4 and 19, at 6 and 19, at 11 and 18, at 11 and 19, at 18 and 20, and at 24 and 27, the corresponding hemi-acetals substituted at the 2, 4, 6, 11, 18, 19, 20, or 24 position and a wide variety of other substituents at these positions.

Depending upon the exact conformation of the steroid nitrite (having 18 to 29 carbon atoms) involved and used during the photolytic process of the present invention, photolysis proceeds with the transfer of the NO group of the nitrite grouping from one carbon atom to an adjacent carbon atom with the formation of an oxime or a nitroso-monomer or nitroso-dimer. While the exact mechanism of the photolytic reaction has not yet been fully established, it appears to involve several intermediate steps, but in all instances the process of the present invention involves the shifting of a nitrogen atom to another carbon atom which is spaced from the original carbon atom to which the nitrogen was linked by two other carbon atoms, e.g., as the C–11 carbon is separated from the C–18 carbon atom by two intervening carbon atoms C–12 and C–13.

It will be understood that the foregoing general description and the following detailed description as well are exemplary and explanatory of the invention but are not restrictive thereof.

In a manner similar to that described for the various foregoing preparations, the other hydroxy steroids having 18 to 29 carbon atoms, and constituting the estrogen, androgen, methyltestosterone, pregnane, cardiac aglycone, bile acid, cholesterol, ergosterol and stigmasterol series, may be reacted with a nitrosyl halide to form the corresponding nitrite esters.

Where there is more than one hydroxy group subjected to the formation of a nitrite ester by treatment with nitrosyl halide, such as the 16α-hydroxy group, it may be advantageous to start with a 16α-acylated compound which lacks the 11β-hydroxy group to treat this compound microbiologically, as with *Curvularia lunuta* (N.R.R.L. No. 2380) to produce the 11β-hydroxy group to be subjected to the formation of the 11β-nitrite ester. After photolysis, the 16α-acylate may be removed to give the 16α-hydroxy group.

Among the many steroid compounds having 18 to 29 carbons which may be nitrited to form nitrite esters are those having substituents or modification of the basic cyclopentanoperhydrophenanthrene ring structure.

Thus in the estrogens having 18 carbon atoms in the ring structure, at position 6, there may be substituted a halogen or a methyl group; at position 9 there may be a α-fluorine, or other halogen; at position 16, there may be an α-hydroxyl group; at position 17, there may be an α-hydroxyl group or an acetoxyl group; at position 18, there may be an aldehyde, a methyl group, a hydroxyl group, a carboxyl group, an amino-methyl group, or a cyanide group.

Additionally, in the androgens, having 19 carbon atoms in the ring structure, there may be a double bond from positions 1 to 2, and/or from 4 to 5.

In the pregnane series, having 21 carbon atoms, in addition to the various substitutions and modifications set forth above, there may be additional substitutions of a hydroxyl or an acetate, butyrate or other carboxylate radical at the 21 position.

In the sterols, having 27 to 29 carbon atoms similar, usual substitutions may be made in the A, B, C, and D rings, or in the side chain.

The various nitrite esters of the 18 to 29 carbon series of steroids may be photolysed by irradiation in solution with ultraviolet light to form the corresponding oximes and nitrosomonomers or dimers by interaction with an available or reactive hydrogen atom in a conformationally adjacent position; that is, a nitrite radical at the 11β position may react with an available hydrogen atom in the 18 or 19 positions; a 2β, 4β or 6β nitrite may react with an available hydrogen in the 19 position; a 1β, 18 or 19 nitrite with hydrogen in the 11 position; a 20α or 20β nitrite with a hydrogen in the 18 position; an 11α-nitrite with hydrogen in the 1 position; a 7β-nitrite with hydrogen in the 15-position; a 15α-nitrite with a hydrogen in the 7 position; and a 24 nitrite with a hydrogen in the 20 position. These oximes, and nitroso dimers, and monomers so produced may thereafter be reacted by conventional steps to produce the corresponding hemiacetals, nitriles, aldehydes, lactones, alcohols, carboxylic acids, carboxylates, as well as other derivatives, all of which have variously modified therapeutic properties with respect to their patent steroid compounds. In many instances, the properties are greatly enhanced with respect to the parent compounds, while in other instances the properties are greatly different, and in a few instances, the properties are antagonistic with respect to the properties of the parent compound. The immediate and ultimate products of the photolysis of the nitrite in accordance with the present invention have an exceedingly wide range of utility. Many of them are useful without further treatment after photolysis, while others may be modified to achieve their greatest present usefulness. When modified, they are useful as improved therapeutic agents, as intermediates providing new and more economical routes to known and to hitherto unknown compounds, as detergents, as perfume substances, as bacteriostats, and many other uses, some of which are hereinafter set forth in detail.

In general, the oxime is the most stable derivative obtained by photolysis, the isomeric nitroso derivative always being formed first and, under prototropic conditions, converted to the oxime. When steroidal nitrite esters (e.g., the 11β-nitrite ester of 16β-methyl-prednisolone acetate) are photolysed and the photolysed product is immediately subjected to separation, as by chromatography, an oxime (e.g., 18-oximino-16β-methyl-prednisolone acetate), is usually recovered with a small amount of the isomeric nitroso-dimer being present. Alternatively alkyl nitrite esters (e.g., 1-octanol nitrite) upon photolysis and immediate separation of the photolysed product preferentially yields the nitroso-dimer (e.g. 4-nitroso-1-octanol-dimer) with a small amount of oxime (e.g. 4-oximino-1-octanol) being present. In the latter case, the nitroso-dimer converts under prototropic conditions to the more stable isomeric form, the oxime. This conversion takes place in the photolysed solution on long standing or may more rapidly be effected by warming the nitroso compound at moderate temperatures, usually in the range of 50–125° C., either alone or in solution and preferentially in a refluxing solution of a lower alkanol such as methanol, ethanol, propanol, and the like. When the photolytic exchange of an NO with a hydrogen atom within the molecule of an HO-C-C-X-CH alcohol, produces a tertiary nitroso derivative, there is usually formed a nitroso-monomer. For example the nitrite ester of a 3-cyclohexyl-1-propanol upon photolysis according to the process of this invention, yields the nitroso-monomer, 3(1-nitroso-1-cyclohexyl)-1-propanol. While the oxime, nitroso-dimer and nitroso-monomer are usually formed by the photolytic process, in a few instances there is some subsequent formation of the nitrone.

The solvents for use in the photolysis are chosen primarily on the basis of their ability to dissolve the steroid nitrite ester to be photolysed, and to a lesser extent upon the facility with which they may be removed by evaporation at moderate temperatures, so that the oximes, nitroso dimers or nitrones may be recovered as crystals without being subjected to a higher degree of heat that is necessary, which would tend to cause decomposition or deterioration of the photolytic products.

Thus, those solvents providing good solubility for the steroid products to be photolyzed are preferred, and those having the additional characteristics of a relatively high molecular weight and a relatively low boiling point are the most desired. For this reason toluene is preferred above the other solvents, although benzene and Freon 113 are almost as advantageous. Among the many other solvents which may be used are acetone, acetonitrile, carbon disulfide, carbon tetrachloride, chloroform, chlorobenzene, cyclohexane, dimethyl ether, dimethylformamide, dioxane, ethyl acetate, heptane, methanol, methylene chloride, and xylene.

Any source of ultraviolet light which provides a strong radiation from about 2000 A. to 5000 A. is suitable, especially in the band from 3400 A. to 4000 A., and a mercury arc lamp, such as the 200 watt Hanovia mercury lamp is suitable, although larger lamps would be needed for economical production on a larger scale. The nitrite solution to be irradiated is preferably contained within a water-cooled immersion well which is substantially transparent to ultraviolet light of the specified wavelengths, and for small quantities a water-cooled Vycor immersion well is preferred.

Other sources of irradiation which may be used in the novel process of this invention are high energy irradiations such as X-rays, gamma-rays and the like.

To eliminate excessive heating of the nitrite during photolysis, the solution being irradiated is preferably surrounded by a filter which eliminates the non-actinic rays which could serve only to heat the solution. Thus, a sleeve of Pyrex glass is preferably provided around the solution undergoing photolysis.

After about 20 minuts of irradiation, in most instances, the photolytic product begins to precipitate from solution, and completion of the photolytic reaction can often be judged by visual examination of the volume of the precipitate, but for more careful control and a more accurate determination of the completion of the photolytic reaction, aliquot samples of the solution undergoing photolysis may be subjected to monitoring by periodic examination of their infra-red absorption spectra to determine the extent to which the nitrite ester has been activated and transformed into the desired reaction products. Conveniently, it is usually necessary only to examine the aliquot sample to determine the remaining quantity of nitrite ester, due to the difference which is readily apparent between the infra-red absorption spectra of the nitrite and the absorption spectra of the oximes, nitrosodimers and nitrones.

In general, the photolysis of the organic nitrite esters is substantially complete after about 1 hour of irradiation under the conditions generally specified in toluene solution, at about 30° C., when irradiated by a 200 watt mercury arc lamp. This time may vary widely due to the difference in actual absorbed ultraviolet energy activating the dissolved nitrite.

Hypohalite esters and preferably hypochlorite esters (I) upon irradiation with ultraviolet light under the conditions described hereinabove for the nitrite ester photolysis, may be photochemically rearranged (I→II) according to the process of this invention, i.e.

The halohydrin, II thus obtained, upon alkaline treatment, such as with alcoholic potassium hydroxide, gives the corresponding 1,4-oxides which, in certain instances may be oxidized (with chromic acid, for example) to give the corresponding lactones.

The hypochlorite ester intermediates are conveniently prepared from the corresponding alcohol, preferably a tertiary alcohol, in an inert solvent such as carbon tetrachloride, using chlorine monoxide.

Thus, 3β-acetoxy-20-methylallopregnane-20-ol reacted with chlorine monoxide in carbon tetrachloride gives 3β-acetoxy-20-methylallopregnane-20-ol 20 - hypochlorite which, upon photolysis in dry benzene using a mercury lamp, yields 3β-acetoxy-18-chloro-20-methylallopregnane-20-ol. Reaction of the aforementioned chlorohydrin with methanolic alkali gives 3β-acetoxy-18,20-oxido-20-methyl-allopregnane which may be oxidized to give 3β-acetoxy-20 - methyl-20-hydroxyallopregnane-18-oic acid (18→20 lactone).

The foregoing general description will now be illustrated by a wide variety of specific working examples in which the nitrite and hypochlorite esters are photolyzed or transformed photo-chemically into other compounds which may be further treated to yield ultimate useful products.

Aliphatic nitrites are readily formed in dry solutions of the corresponding alcohols by adding a solution of nitrosyl chloride to the solution of the alcohol. A wide variety of organic solvents may be used; but dimethylformamide, acetic anhydride or pyridine is preferred.

PREPARATION NO. 1

Specifically, 2-methyl-1-hexanol dissolved in pyridine to form a 5% solution is treated while stirring with a 10% solution of nitrosyl chloride in pyridine, and the addition of nitrosyl chloride is continued until the color of the solution remains unchanged on further additions of nitrosyl chloride. The temperature for the reaction may be as high as 30° C. or it may be much lower.

Addition of a small amount of water to the solution causes decomposition of the excess nitrosyl chloride, after which the solvent, pyridine may be distilled off in vacuo to leave the 2-methyl-1-hexyl-nitrite.

In an identically similar manner, the corresponding nitrites of other aliphatic alcohols may be formed, of the primary, secondary, normal, iso-, alkanols, and the alkenols and alkynols. Typical of these alcohols are the following: 1-heptanol, 1-octanol, 1-lauryl alcohol, n-cetyl alcohol, n-stearyl alcohol, 2-heptanol, 3-heptanol, 2-octyl alcohol, 2-ethyl hexanol-1, undecenyl alcohol, 10-(11)-octadecen-1-ol, undecelynic alcohol.

PREPARATION NO. 2

The nitrite ester of geraniol, and similar terpenes such as nerol (the trans isomer of geraniol), may be readily formed by slowly adding an excess of a nitrosyl chloride solution in pyridine to a pyridine solution of geraniol, while the solutions are thoroughly mixed, as by stirring. When the characteristic color of the nitrosyl chloride persists, the excess is decomposed by the addition of water to the solution. Thereafter the geraniol nitrite may be extracted by dimethyl ether, which is separated and evaporated to yield geraniol nitrite.

PREPARATION NO. 3

A 10% solution of o-tolyl methanol in pyridine is treated while stirring with an excess of nitrosyl chloride, followed by water quenching and the separation of the o-tolyl methyl nitrite for photolysis. In similar fashion, 1-carbinol-2,4-dimethyl-benzene yields 1-carbinol nitrite-2,4-dimethyl benzene; 1 menthol yields 1 menthol nitrite; 1-carbinol-2-methyl naphthalene yields 2-methyl naphthalene-1-methyl-nitrite; 1-carbinol-2-methyl anthracene yields 1-carbinol nitrite-2-methyl anthracene.

As with the alkyl and aryl alcohols, the alicyclic alcohols are readily converted into the corresponding nitrite esters by reaction in dry solvents, such as pyridine, dimethyl formamide or acetic anhydride, with nitrosyl halide solution, which may be added either in the form of a solution thereof, or by distilling the nitrosyl chloride gas directly into the solution of the alicyclic alcohol. The reaction is preferably carried out at moderate temperatures, such as from 30° C. to temperatures as low as −30° C. and in all cases the addition of nitrosyl chloride is continued until a slight excess has been added, which may be determined by the color of the solution or on a weight basis. Then enough water is added to decompose any excess nitrosyl chloride, after which the nitrite is removed from its solvent, as by evaporation.

Likewise, alicyclic nitrites may be prepared from the corresponding alcohols.

The following alicyclic alcohols are typical of those which may be similarly treated according to the present invention and for the formation of nitrite esters: cyclohexane-ethanol which yields cyclohexane-ethyl nitrite; cycloheptanol which yields cycloheptanyl nitrite; cyclo-octanol which yields cyclo-octyl nitrite.

The nitrites of the heterocyclic alcohols can also be formed in a similar manner.

As examples of the various heterocyclic alcohols which can be usefully employed in the formation of the nitrite esters, the following are given:

PREPARATION NO. 4

A 10% solution of tropine in pyridine reacted with a slight excess of nitrosyl chloride yields tropine nitrite which is recovered by water precipitation and filtering from the pyridine.

Similarly, 2-hydroxymethyl-3-ethyl pyridine yields its corresponding nitrite, 2-hydroxymethyl-3-methyl-pyridine is converted to its nitrite ester, dihydrocodeinol nitrite is formed by reaction of nitrosyl chloride on dihydrocodeinol in pyridine solution.

PREPARATION NO. 5

Penicillin G is first subjected to treatment with dilute sodium hydroxide to yield the sodium salt of penicillin, which is then crystallized and dissolved in pyridine to form a 10% solution. This solution is then treated with a slight excess of nitrosyl chloride at room temperature, after which the excess nitrosyl chloride and the pyridine solvent is removed by evaporation and filtration to yield the nitrite ester.

Other heterocyclic compounds with an atom other than carbon between the carbon holding the nitrite group and the carbon holding the reactive, conformationally adjacent hydrogen, such other atom being oxygen, nitrogen or sulfur, are typified by the following:

PREPARATION NO. 6

$\beta$-diethylamino-$\alpha$-phenylethyl alcohol dissolved in pyridine to form a 10% solution is reacted with a slight excess of nitrosyl chloride to form the corresponding nitrite ester, which is then first quenched with the addition of a slight amount of water. Thereafter, the nitrite ester is separated from its solvent.

Similarly, 1-(p-chloro-$\alpha$-phenylbenzyl)-4-(2-hydroxyethoxyethyl) piperazine in pyridine may be treated in the identical manner to form its corresponding nitrite ester; also propyl-($\beta$-hydroxy-$\gamma$-chloropropyl) sulfide in solution in dimethyl formamide may be so treated to form the corresponding nitrite ester, which is separated from its solvent to yield the nitrite ester to be subjected to photolysis.

Steroid nitrites according to the present invention may also be prepared from the corresponding alcohols, and the following specific examples are typical of the preparation of steroid nitrites according to the present invention and for subsequent photolysis. The details of the examples of U.S. Patent 3,215,713, granted November 2, 1965, of which this application is a continuation-in-part, are incorporated herein by reference.

PREPARATION NO. 7

11$\beta$-hydroxyestrone is readily converted to the 3 acetate and then to 11$\beta$-nitrite of estrone by dissolving 3.0 g. of the 11$\beta$-hydroxyestrone, by conventional processes of acetylating the 3-hydroxy group, as by treatment with an excess of acetic anhydride, and by evaporating the acetic anhydride in vacuo. Thereafter the 11$\beta$-hydroxy estrone 3 acetate is dissolved in 100 ml. of pyridine, and there is slowly added to the solution while stirring about 80 ml. of a 1% solution of nitrosyl chloride in pyridine. The addition is preferably made dropwise while the solutions are at a temperature of approximately −10° C., and the addition is continued until the color of the solution remains unchanged by further additions of the nitrosyl chloride solution. After standing for an hour, the 11$\beta$-nitrite of estrone may be precipitated from solution by the addition of water to the solution, and the 11$\beta$-nitrite may then be recovered by filtration.

PREPARATION NO. 8

The 11$\beta$-nitrite ester of estradiol may be formed in exactly the same manner as set forth in Preparation 7, except that 11$\beta$-hydroxyestradiol is first acetylated at C–3 and C–17, and is then treated with nitrosyl chloride to form the 11$\beta$-hydroxy nitrite ester of estradiol 3-diacetate.

PREPARATION NO. 9

A solution of 2.5 g. of 11$\beta$-hydroxy-$\Delta^4$-androstene-3,17-dione in 100 ml. of dimethylformamide, cooled to about −25° C. is titrated with about 50 ml. of a 1% solution of nitrosyl chloride in pyridine until the color of the solution remains substantially unchanged. After an hour, the 11$\beta$-nitrite of hydroxy-androstenedione is precipitated by the addition of water, and the 11$\beta$-nitrite may be recovered by filtering.

PREPARATION NO. 10

A stirred solution of 2.7 g. of 11$\beta$-hydroxytesterone-17-acetate dissolved in 100 ml. of dry pyridine and cooled to about 0° C. or lower, is treated with nitrosyl chloride by slowly adding about 50 ml. of a 1% solution in dry pyridine until a dark blue or green color persists in the mixed solutions. After about 5 minutes, water is added to the reaction mixture to precipitate the product and to decompose any residual nitrosyl chloride. Filtration of the crystalline solid and recrystallization from methylene chloride gives the 11$\beta$-nitrite ester of testosterone-17-acetate as crystalline white needles.

PREPARATION NO. 11

A solution of 3.0 g. of 11β-hydroxyisoandrosterone 3 acetate in 100 ml. of dry pyridine cooled to about −20° C. is constantly stirred while nitrosyl chloride is allowed to distill into the steroid solution until the color of the nitrosyl chloride persists. Thereafter, water is added to precipitate the 11β-nitrite ester of androsterone 3 acetate formed by the reaction of the nitrosyl chloride with the 11β-hydroxy steroid. The crystalline precipitate is then filtered, the filtrate washed, and dissolved in and recrystallized from a volatile solvent, such as methanol, methylene chloride or hexane.

Other steroid nitrite esters are prepared in analogous fashion as described heretofore. The pertinent details of which are set forth in the following tabulation:

| Starting Material | Reaction Conditions | | | Product |
| --- | --- | --- | --- | --- |
| | Solvent | NOCL (Vol. 1% Pyridine Solution) | Reaction Temp., °C. | |
| 11β-hydroxy-17α-methyl testosterone 17-acetate | Pyridine | Excess | 30 | 17α-methyl testosterone 17-acetate 11-nitrite. |
| 6β-hydroxy-3β,21-diacetoxy-20-keto-5α-pregnane, 2.0 g. | do | do | −30 | 3β,21-diacetoxy-20-keto-5α-pregnane-6β-nitrite (rx-hexane).[1] |
| Cortisol 21-acetate, 4.0 g | do | do | 0 | Cortisol 21-acetate 11β-nitrite (rx-methylene chloride).[1] |
| Corticosterone 21-acetate, 3.0 g | DMF [2] | 55 ml | −10 | Corticosterone 11β-nitrite 21-acetate (rx-methylen chloride).[1] |
| 16α-hydroxycorticosterone 16,21-diacetate, 2.5 g | Pyridine | 45 ml | −20 | 16-acetoxycorticosterone 11β-nitrite 21-acetate (rx-methylene chloride).[1] |
| 16α-methyl corticosterone 21-acetate, 2.5 g | do | 40 ml | −20 | 16α-methyl corticosterone 11β-nitrite 21-acetate (rxe methylene chloride).[1] |
| Pregnane-3α-11β-17α,20β-tetrol, 3,20-diacetate, 2.5 g. | do | Gaseous | −20 | Corresponding 11β-nitrite (rx-methylene chloride- or methanol or hexane).[1] |
| Prednisolone 21-acetate, 3.0 g | DMF [3] | 60 ml | −10−−25 | Prednisolone 11β-nitrite 21-acetate (rx-methylene chloride).[1] |
| 11β-17α-dihydroxyprogesterone 17-acetate, 3.6 g | Pyridine | 75 ml | −30 | 17α-acetoxy progesterone 11β-nitrite (rx-methylene chloride hexane).[1] |
| 11β-hydroxyprogesterone, 4.0 g | do | Gaseous | −20 | Progesterone 11β-nitrite (rx-methanol or methylene chloride or hexane).[1] |
| 16α-methylprednisolone 21-acetate, 3.0 g | DMF | 55 ml | −25 | 16α-methyl-prednisolone 11β-nitrite 21-acetate (rx-methylene chloride).[1] |
| Dexamethasone 21-acetate, 3.0 g | DMF | 50 ml | −20 | Corresponding 11β-nitrite ester (rx-methylene chloride).[1] |
| 11β-hydroxycholestanol-3-acetate, 3.3 g | Pyridine | Excess | −15 | Corresponding 11β-nitrite (rx-methylene chloride).[1] |
| 4,5-oxido-dehydrocortisol 21-acetate | do | do | −20 | Corresponding 11β-nitrite. |
| Δ7,22-ergostadiene-3β,5α,6β-triol-3-acetate | do | do | −20 | Corresnonding 6β-nitrite ester. |
| 2β-hydroxycholestanyl 3-acetate | do | do | 0 | Cholestanyl 3-acetate 2β-nitrite. |

[1] rx=recrystallization solvent.
[2] Also by using 85 ml. 1% solution NOBr in pyridine.
[3] Also by using 100 ml. 1% solution NOBr in pyridine.

The various compounds set forth above may be photolyzed and further converted into various intermediates and final compounds in accordance with the general procedures set forth above, and more specifically set forth below.

Photolysis Example No. 1

The product, 2-methyl-1-hexyl-nitrite, is dissolved in a solvent, such as toluene, and is irradiated under an atmosphere of nitrogen for 30 to 60 minutes by ultraviolet light from a mercury arc lamp at a temperature of from 15 to 40° C., preferably at about 25° C. while contained in a water-cooled Vycor immersion well in proximity to a 200 watt Hanovia high-pressure mercury arc lamp having substantial radiation in the band from 3000 A. to 4500 A., and especially in the band from 3400 A. to 4000 A.

The progress of the photolytic reaction is monitored from time to time by measurement of the infra-red absorption spectrum of the nitrite ester, and when it has been determined that the nitrite radical has substantially disappeared, the material being irradiated is removed and comprises principally 4-nitroso-2-methyl hexan-1-ol dimer, which is converted to the isomeric oxime by heating a methanolic solution of the dimer overnight at reflux temperature and removing the solvent to give 4-oximino-2-methyl-hexan-1-ol, which may be converted into the amine by reduction, as with sodium-ethanol and into the corresponding quaternary ammonium salt by treatment with methyliodide. This salt is useful as a disinfectant and emulsifying agent for cutting oils.

Photolysis Example No. 2

1-octyl nitrite is photolysed under the conditions specified above, except that the nitrite may be in the form of a 2% solution in benzene, and yields 4-nitroso-octan-1-ol dimer which is heated in a sealed vessel at 60° C. for 48 hours to give a 4-oxinimo-octan-1-ol which by treatment with acetic acid and aqueous sodium nitrite may be converted to 4-keto-octanol-1. This product 4-keto-octanol-1 is useful as an additive to lubricating oils to improve the extreme pressure properties of the lubricant, as it tends to promote adherence to the metal and forms a resistant film thereon.

Photolysis Example No. 3

The product 1-lauryl nitrite on photolysis in toluene solution and with subsequent heating under the conditions specified above produces 4-oximino-1-lauryl alcohol, which on reduction by metallic sodium and ethyl alcohol yields 4-amino-1-lauryl alcohol which is a surface active agent with detergent properties and is suitable for use in water solution as a detergent.

Photolysis Example No. 4

Undecelenic nitrite when photolysed under the conditions specified above in benzene solution yields 4-nitroso-undecelenic alcohol dimer which is heated in refluxing methanol to give 4-oximino-undecelenic alcohol which may be converted to yield the 4-keto compound by treatment with acetic acid and aqueous sodium nitrite solution, or alternatively may be converted to the amine and then to the quaternary ammonium salt by the steps recited above.

The quaternary ammonium salt is useful as a germicide.

Photolysis Example No. 5

The nitrite ester of undecelynic alcohol may be photolysed to yield 4-nitroso-undecelynic alcohol dimer which upon heating at 60° C. yields the 4-oximino compound which may be further converted to the 4-amino compound by lithium aluminum hydride reduction. It is useful in the treatment of certain forms of infection known as "athlete's foot."

Photolysis Example No. 6

Geraniol nitrite on photolysis in benzene solution under the conditions described above yields predominately the 3-nitrosomethyl dimer derivative which is heated at 70°

C. to give the 3-oximinomethyl derivative. Some 4-oximino derivative is also formed and need not be separated.

*Photolysis Example No. 7*

The alkyl substituted ortho-benzyl nitrites, such as ortho-tolyl methyl nitrite, and similar compounds in which the methyl group is replaced by an ethyl or a propyl group, and which result from the formation of the nitrite ester of the corresponding alcohol are dissolved in a solvent, such as toluene and irradiated, under the conditions set forth above, until the nitrite groups have substantially been converted into the corresponding nitroso dimer, which is convertible on long standing at room temperature or upon heating at 60° C. for about 2 hours to the corresponding oxime.

Under these conditions the ortho-tolyl methyl nitrite is photolytically converted to the ortho-nitroso tolyl alcohol dimer and thence to the ortho-oximino tolyl alcohol, which by reaction with nitrous acid is then converted into the corresponding 1,2-hemiacetal of ortho-tolyl alcohol, which may then be separated from its solution by the addition of water, filtering and washing with water.

This hemiacetal may be converted into the corresponding amine, or into an alkyl ether, and in its various end products provides useful materials of pleasing, aromatic odor which are valuable as perfume substances.

*Photolysis Example No. 8*

The nitrite ester of 1-hydroxymethyl-2-methyl-naphthalene may be treated in exactly the same manner as the nitrite esters of the Example 7, to give the corresponding oxime hemiacetal, or the corresponding ether of the hemiacetal, all of which are useful as perfume substances for soap.

*Photolysis Example No. 9*

Tropine nitrite in a 2% solution in benzene, on photolysis under the conditions above specified, yields oximino tropine. When subjected to treatment with nitrous acid, the oximino tropine is converted to the corresponding ketone.

Tropic acid (alphaphenylbetahydroxypropionic acid) is reacted with diazomethane to form the methyl ester of tropic acid, and this methyl ester is then reacted by ester interchange with the oxo-tropine to yield oxo-atropine.

Oxo-atropine is useful as an anti-spasmodic and is somewhat superior to atropine in that respect.

*Photolysis Example No. 10*

The nitrite ester of 2-ethyl-3-hydroxymethyl pyridine reacts in exactly the same manner to yield 2-($\alpha$-nitrosoethyl)-3-hydroxymethyl pyridine dimer which converts to 2-($\alpha$-oximinoethyl)-3-hydroxymethyl pyridine and may then be converted to the keto compound which may be treated as in the next example.

*Photolysis Example No. 11*

The nitrite ester of 2-methyl-3-hydroxymethyl pyridine when photolysed in benzene or toluene solution yields 2-nitrosomethyl-3-hydroxymethyl pyridine dimer which converts to 2-oximinomethyl-3-hydroxy pyridine which is converted to the ketone by treatment with nitrous acid and to the hemiacetal and thence to the 2-methylhydrazine-3-hydroxy-methyl pyridine by treatment with aqueous hydrazine sulfate and warming. This final compound is a psychic energiser (*d*-aminoacid oxidase-inhibitor).

*Photolysis Example No. 12*

The 11$\beta$-nitrite of estrone is dissolved to form a 2% solution in toluene, and is irradiated at a temperature of from 15 to 40° C., preferably at about 30° C., for a period of 30 to 60 minutes, the solution being agitated by bubbling nitrogen through it. The preferable form of the apparatus employed for the irradiation is that set forth above and comprises the 200 watt Hanovia high-pressure mercury arc lamp, provided with a Pyrex sleeve, with the solution contained in an ultra-violet transmitting receptacle, such as a water-cooled Vycor immersion well. The nitrite in solution is thus subjected to ultra-violet radiation from 3000 A. to 4500 A., especially in the band of 3400 A. to 4000 A. During the irradiation, the progress of the photolysis is monitored by infra-red spectral observation of the absorption bands of a small sample of the photolysed mixture so as to determine when the characteristic absorption spectrum of the nitrite radical has substantially disappeared.

The photolysed solution comprises 3-acetoxy-11$\beta$-hydroxy-18-oximinoestrone which may be purified by chromatography after the toluene solvent has been evaporated by bubbling air through the solution or by boiling under reduced pressure. For the chromatographic separation, the column may be filled with Florisil, and the elution may be carried out using ether-benzene mixtures containing increasing quantities of ether; the oxime being eluted when the concentration of the ether in the developing solvent reaches beyond about 30%. Thereafter, the solvent fractions containing the 18-oxime may be evaporated to yield crystals of the 18-oxime, after which the 18-oxime may be purified by recrystallization from ethyl acetate and then from ethyl alcohol.

The purified 18-oxime may then be converted to the corresponding hemiacetal by dissolving it in about 10 times its weight of glacial acetic acid, after which there is added about one-fourth volume of a 5% solution of sodium nitrite. Gas is evolved, and after shaking for a few minutes white crystals separate, which may be purified by recrystallization from a suitable solvent, such as methanol.

11–18 hemiacetal of estrone-3-acetate exhibits enhanced estrogenic physiological activity, resulting in proliferation of endometrium, inhibition of pituitary follicular stimulating hormones and lowers serum cholesterol. It usually exhibits greater activity when given orally, than when administered parenterally.

*Photolysis Example No. 13*

The 11$\beta$-nitrite ester of estradiol-3,17-diacetate may be similarly photolysed to yield the corresponding oxime, which may then be converted to estradiol-3-17-diacetate-11-18 hemiacetal. When purified by recrystallization from methanol, it exhibits much the same properties as does estrone-3-acetate-11-18 hemiacetal, but is somewhat more active therapeutically than is estrone-3-acetate-11-18-hemiacetal.

*Photolysis Example No. 14*

The 11$\beta$-nitrite ester of testosterone-17-acetate when treated as above, yields the photolytic product, 11$\beta$-hydroxy-18-oximinotestosterone-17-acetate which may be further converted to 11$\beta$-hydroxy-18-aminotestosterone-17-acetate by conventional treatment with lithium-aluminum hydride followed by reoxidations with manganese dioxide.

If desired the 18-amino compound may be further reacted to convert it into the corresponding quaternary ammonium salt which is useful as a sympatholytic agent acting by ganglionic neural transmission, and which is also useful as an anti-spasmodic. The 18-amino compound may be converted to the quaternary ammonium salt by treating the 18-amino compound with methyl iodide and with mild heat.

*Photolysis Example No. 15*

17$\alpha$-methyl-testosterone-acetate - 11$\beta$-nitrite is subjected to photolysis according to the procedure set forth heretofore, by which there is produced the 18-oxime compound. By reaction with aqueous sodium nitrite in glacial acetic acid solution, this 18-oxime is converted into the 11-18-hemiacetal. When recrystallized from methanol or other suitable solvent it has the same general properties as 17α-methyl testosterone acetate, but with enhanced androgenic activity, and it also has the property of inhibiting pituitary follicular stimulating hormones in the human system.

*Photolysis Example No. 16*

Under conditions identical with those of Example 12, a 1% solution of cortisol acetate 11β-nitrite yields the 18-oxime of cortisol-21-acetate which may be converted to 11-18-hemiacetal of cortisol-21-acetate, as described above.

The hemiacetal prepared from the 18-oxime of cortisol acetate has enhanced anti-inflammatory activity with respect to its parent compound, is an anti-anabolic agent, is useful in the treatment of collagen diseases, rheumatoid arthritis and asthma, lupus erythematosis and various skin dermatoses, atopic dermatitis and pemphigus.

*Photolysis Example No. 17*

Corticosterone acetate 11-β-nitrite may be converted into aldosterone by photolysis and subsequent chemical treatment, as follows:

Corticosterone 11β-nitrite 21-acetate in dry toluene (3% concentration) is irradiated under the conditions set forth above in connection with Example 12, at about 40° C. After about 20 minutes separation of a solid begins and this separation seems to be complete after about 40 to 60 minutes. The crystalline solid is removed by filtration and is the 18-oximino-11β,21-dihydroxy-pregn-4-ene-3,20-dione 21-acetate. It is added at about 10° C. to 5 to 10 times its weight of glacial acetic acid, after which there is added about 3 to 5 times its weight of a 5% aqueous solution of sodium nitrite. The mixture effervesces and the oxime is rapidly dissolved. The solution is then allowed to warm to room temperature, is then diluted with water, made slightly alkaline with sodium bicarbonate, and is then extracted with methylene chloride. The extract is then dried with sodium sulfite and is evaporated to give a colorless gum which may be crystallized from ethyl acetate to give aldosterone 21-acetate, which if desired may be converted to aldosterone.

Aldosterone, as is known, may be used in the treatment of Addison's disease, and other disorders involving adrenal insufficiency.

Thus according to the foregoing by photolysis and subsequent treatment with nitrous acid:

16α-methylcorticosterone acetate 11β-nitrite is converted to 18-oximino-16α-methylcorticosterone-11β-nitrite which may then be converted to the 11-18 hemiacetal of 16α-methylcorticosterone 21-acetate;

16β-methylcorticosterone acetate 11β-nitrite is converted to 18-oximino-16β-methylcorticosterone-11β-nitrite which may then be converted to the 11-18 hemiacetal of 16β-methylcorticosterone 21-acetate;

16α-acetoxy-1-dehydrocorticosterone acetate 11β-nitrite yields the 18-oximino compound and finally the 11-18 hemiacetal;

16α-methyl-1-dehydrocorticosterone-21-acetate 11β-nitrite yields the 18-oximino compound and finally the 11-18 hemiacetal;

16β-methyl-1-dehydrocorticosterone-21-acetate 11β-nitrite yields the 18-oximino compound and finally the 11-18 hemiacetal.

*Photolysis Example No. 18*

The 11β-nitrite ester of prednisolone acetate may be photolysed in the manner set forth above to yield the corresponding 18-oxime, which may then be treated with nitrous acid while in acetic acid solution to form the 11-18 hemiacetal which is useful in much the same manner as its parent compound, prednisone, and is somewhat more active than cortisol acetate.

The 18-oxime may be converted to the corresponding lactone by treatment of the oxime in acetone solution with chromic acid acetone solution. The lactone is then purified by recrystallization and yields a product which is a nateuretic agent leading to the loss of sodium in the human body and which also promotes osmotic diuresis.

*Photolysis Example No. 19*

The 11β-nitrite ester of 17α-acetoxyprogesterone is photolysed under the conditions set forth above and yields the corresponding 18-oxime or by the reactions set forth above.

The hemiacetal is useful by reason of its enhanced progestational activity, which induces the secretory phase of endometrial proliferation, and may be used in the treatment of menstrual disorders, such as dysmennorhea. It is also active topically against various dermatological diseases, such as topic dermatitis, exzema and contact dermatitis.

*Photolysis Example No. 20*

Subjecting the 11β-nitrite ester of dexamethasone 21-acetate to photolysis in toluene solutions, under the conditions which have been set forth above, yields the 18-oxime which may be converted to the hemiacetal in accordance with the procedure set forth in Photolysis Example 12. This hemiacetal is another nateuretic agent promoting osmotic diuresis and is somewhat more effective in this regard than the 11-18 hemiacetal of prednisolone acetate.

*Photolysis Example No. 21*

Cholestanol-3-acetate-11β-nitrite irradiated in toluene solution by ultra-violet light at a temperature of about 30° C. for an hour while being stirred by bubbling nitrogen through the solution. The resulting compound is the 18-oxime which is separated by chromatography in a column filled with Florisil, successively amounts of ether-benzene mixtures containing increasing amounts of ether. The solvent fractions containing the 18-oxime may be evaporated to yield crystals of the oxime which may be further purified by recrystallization from ethyl acetate.

The purified oxime may then be converted to the corresponding hemiacetal by dissolving it in glacial acetic acid, followed by the addition of aqueous sodium nitrite. The resulting white crystals may then be filtered off and purified by recrystallization from methanol.

The hemiacetal is therapeutically useful in lowering serum cholesterol and in the treatment of arteriosclerotic diseases.

*Photolysis Example No. 22*

The 2β-nitrite ester of 2β-hydroxy cholestanyl acetate on photolysis yields the 19-oxime and by nitrous acid treatment the 2-19 hemiacetal of cholestanyl acetate is produced which is useful in the treatment of distemper, *Trichomonas columbiae, Trichomonas foetus* infection in cattle, and also serves to inhibit growth and development of *Blatella germanica* L.

The process of the present invention is also especially adapted to the production of poly-ols, such as triols from nonohydric alcohols, by repeating the process involving the formation of the nitrite ester from a suitable alcohol and then after photolysis converting the photolytic product to a diol, which is then reacted to form a new nitrite ester, which is again photolysed and may be converted to a triol.

Exemplary of this extension of the process is the following example:

1-decanol is reacted with an excess of nitrosyl chloride to form the nitrite ester, 1-decanyl nitrite (n-decanyl nitrite), by distilling nitrosyl chloride into the liquid decanol. Thereafter the excess nitrosyl chloride is decomposed by the addition of a small amount of water to the mixture, followed by thorough agitation, and by separation of the water layer from the layer of decanyl nitrite, thereby yielding the 1-decanyl nitrite for later photolysis.

On subjecting the 1-decanyl nitrite to photolysis in pyridine solution, there is produced the oxime 4-oximino-decanol-1 which may be subjected to acetylation by treatment with acetic anhydride to form the 1-acetate, which is then reduced to the corresponding 4-amine, and is then oxidized to form decan-diol-1,4 1-acetate which may be again transformed into the nitrite ester by treatment in solution with nitrosyl chloride. This nitrite ester (decandiol-1,4-1-acetate, 4-nitrite) is then photolyzed and yields the 7-oximino 1,4-decan-diol 1-acetate which may be reduced to yield decanyl-1,4,7-triol, which is useful as an intermediate in the production of polymers, for plastics, and as humectants.

In general, the oximes resulting from the photolysis of the nitrite esters may be purified by chromatography, on a Florisil column which is then successively eluted with mixed solvents, such as methylene chloride containing increasing amounts of acetone, or with acetone containing increasing amounts of methanol, in the conventional manner.

Further examples of the photolysis process of this invention are as follows:

Photolysis Example No. 23

To a solution of 20-methylallopregnane-3β-acetoxy-20-ol (752 mg.) in dry carbon tetrachloride (40 cc.) containing anhydrous potassium carbonate (2 g.), cooled to 0° C., is added a carbon tetrachloride solution of chlorine mono-oxide (6 cc., 1 N). The reaction mixture is kept at 0° C. for ½ hour. The solids are then removed by filtration, and the filtrate evaporated under vacuum at 5° C. to yield a residue which is crystallized from carbon tetrachloride to give 20-methylallopregnane-3β,20-diol 3-acetate 20-hypochlorite.

20-methylallopregnane-3β,20-diol 3-acetate 20-hypochlorite (752 mg.) in dry benzene (80 cc.) is photolyzed for 1 hr. using a 200 watt Hg lamp and Pyrex filter. The reaction mixture is then washed with aqueous sodium carbonate, dried and evaporated to a residue containing 18-chloro-20-methylallopregnane - 3β,20 - diol 3 - acetate which residue is added to 5 percent methanolic potassium hydroxide (50 cc.) and refluxed for 2 hrs. After being cooled, the reaction mixture is diluted with water, extracted with methylene chloride, dried and evaporated to a residue which is reacted with acetic anhydride and pyridine to give 18,20-oxido-20-methylallopregnane-3β-ol 3-acetate.

To a refluxing solution of chromium trioxide (200 mg.) in acetic acid (10 cc., 90 percent) is added dropwise a solution of the acetoxy ether (90 mg.) in glacial acetic acid (10 cc.) and the reaction mixture further refluxed for 15 minutes. After being cooled, it is decomposed with methanol, diluted with cold water, extracted with ether, and washed with water, dried, and evaporated to a residue which is crystallized from methanol to give the lactone 3β-acetoxy-20-methyl-20-hydroxy-allopregnane-18-oic acid (18→20 lactone).

The compounds, 18,20-oxido-20-methylallopregnane-3β-ol 3-acetate and 3β-acetoxy-20-methyl 20-hydroxyallopregnane-18-oic acid (18→20 lactone) are pharmacologically valuable in that they decrease tubular reabsorption of sodium and water and manifest certain diuretic properties. The chlorohydrin photolysis product, 18-chloro-20-methylallopregnane-3β-20-diol 3- acetate, is valuable mainly as an intermediate in preparing the pharmacologically active oxide and lactone compounds.

Photolysis Example No. 24

To a solution of 6α-methylcholestan 3β-6β-diol 3-acetate (1.8 g.) in dry carbon tetrachloride (80 cc.), containing anhydrous potassium carbonate (4 g.), cooled to 0° C., is added to carbon tetrachloride solution of chlorine mono-oxide (8.2 cc., 1.5 N). The reaction mixture is left at 0° C. and followed by infrared spectrum analysis for the disappearance of the —OH band at 3820 cm.$^{-1}$ After 15–20 minutes, the reaction is complete (as indicated by the lack of the —OH band) and the solids are removed by filtration. The filtrate is evaporated under vacuum at 5° C. to a residue substantially of 6α-methylcholestan-3β,6β-diol 3- acetate 6-hypochlorite.

6α-methylcholestan-3β,6β-diol 3-acetate 6-hypochlorite (1.8 g.) in dry benzene (80 cc.) is photolyzed for 1½ hours using a 200 watt Hg lamp and a Pyrex filter. The photolysis mixture is then washed with aqueous sodium bicarbonate, dried and evaporated to a residue containing 6α-methyl-19-chlorocholestan-3β,6β-diol 3 - acetate, which residue is added to 5 percent methanolic potassium hydroxide (50 cc.), refluxed for 1½ hours, diluted with water, extracted with methylene chloride, dried, and evaporated to a residue which is chromatographed on alumina to give after crystallization from ethyl acetate, the oxide alcohol, 6α-methyl-6β,19-oxidocholestan-3β-ol 3-acetate.

The oxido compound, 6α-methyl-6β,19-oxidocholestan-3β-ol 3-acetate is valuable pharmacologically in that it causes a decrease in serum cholesterol lowering and, thus, is useful in the treatment of arteriosclerosis.

It is obvious to one skilled in the art that other steroidal hydroxy derivatives may be converted to therapeutically valuable steroidal oxido and lactone derivatives by utilizing the procedures outlined in Photolysis Examples 23 and 24 in conjunction with other techniques known in the art. For example, 6α-methyl-17α,20,20, 21 - bismethylene - dioxy - 3 - ethylenedioxy - allopregnane - 6β - ol - 11 - one reacted with chlorine monooxide in carbon tetrachloride according to the process described is converted to 6α-methyl-17,20,20,21-bismethylenedioxy-3-ethylenedioxy-allopregnane-6β-ol-11-one 6 - hypochlorite which upon photolysis in the manner of Photolysis Example 24 gives 6α-methyl-17α,20,20,21-bismethylenedioxy - 19 - chloro - 3 - ethylenedioxy - allopregnane - 6β-ol-11-one which upon treatment with methanolic potassium hydroxide yields 6α-methyl-6β,19-oxido-17α,20,20, 21 - bismethylenedioxy - 3 - ethylene - dioxy - allopregnane - 11 - one. Conversion of this 6β,19-oxido derivative to an active corticoid is accomplished by utilizing the following sequence of reactions. Hydrolysis of 6α-methyl - 6β,19 - oxido - 17α,20,20,21 - bismethylenedioxy-3-ethylenedioxy-allopregnane-11-one with aqueous formic acid yields 6α-methyl-6β,19-oxido-allopregnane-17α,21-diol-3,11,20-trione, which is converted to the corresponding 21-acetate ester by treatment with acetic anhydride in pyridine. Bromination in dioxane with 2 moles of bromine per mole of the aforementioned oxido-allopregnane yields 2,4-dibromo-6α-methyl-6β,19-oxido-allopregnane-17α,21-diol-3,11,20-trione 21-acetate, which, when heated in hot dimethylformamide yields 6α-methyl-6β,19-oxido-prednisone 21-acetate (i.e., 6α-methyl-6β,19-oxido-1,4-pregnadiene-17α,21-diol-3,11,20-trione 21 - acetate) which is valuable as an anti-inflammatory agent.

To obtain the (6→19 lactone), the intermediate 6α-methyl - 6β,19 - oxido - 17α,20,20,21 - bismethylenedioxy-3-ethylenedioxy-allopregnane-11-one is reacted with hot chromic acid in a manner similar to that outlined in Photolysis Experiment 23 to give the lactone, 6α-methyl-17α,20,20,21 - bismethylenedioxy - 3 - ethylenedioxy - allopregnane - 19 - oic acid (6→19 lactone). By utilizing the sequence of reactions outlined in the preceeding paragraph, i.e. hydrolysis of the group at the 3,17 and 20 carbon atoms by means of aqueous formic acid followed by 21-acetylation and the introduction of the Δ$^{1,4}$ double bonds by bromination at C-1 and C-4 followed by dehydrobromination with dimethylformamide yields the active corticoid 6α-methyl-1,4-pregnadiene-17α,21-diol-3,11,20-trione-19-oic acid (6→19 lactone) 21-acetate which possesses anti-inflammatory activity.

The invention in its broader aspects is not limited to the specific steps, processes and compositions shown and described but departures may be made therefrom within the scope of the accompanying claims.

I claim:

1. A process of converting a derivative of an organic compound, said derivative having at least six carbon atoms and an atom selected from the group consisting of carbon, sulfur, oxygen and nitrogen, and also having a radical OY wherein Y is a member of the group consisting of halogen and nitroso; said derivative including an arrangement of atoms represented by the following diagram:

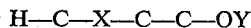

wherein OY is a radical as defined hereinabove, H is a reactive hydrogen conformationally adjacent to said radical OY, and X is an atom selected from the group consisting of carbon, nitrogen, sulfur, and oxygen; which comprises irradiating a solution of said derivative with ultraviolet radiation having a band of radiation approximating that absorbed by the OY radical, and in said derivative thus irradiated, photolytically exchanging said reactive hydrogen with the Y group in said OY radical.

2. A process according to claim 1 wherein Y is nitroso, said process comprising converting a nitrite ester of an organic compound, said nitrite ester having a nitrite radical and additionally at least six carbon atoms and an atom selected from the group consisting of carbon, oxygen, sulfur, and nitrogen, said nitrite ester including an arrangement of atoms represented by the following diagram:

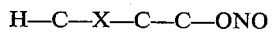

wherein ONO is a nitrite radical, H is a reactive hydrogen conformationally adjacent to said nitrite radical, and X is an atom selected from the group consisting of carbon, nitrogen, sulfur, and oxygen; which comprises irradiating a solution of said nitrite ester with ultraviolet radiation having a band of radiation approximating that absorbed by the nitrite radical, and in said nitrite ester thus irradiated, photolytically exchanging said reactive hydrogen with the NO group in said nitrite radical.

3. A process according to claim 2 wherein said ultraviolet radiation has a band of radiation within the range of 2000 A. and 5000 A.

4. The process of claim 2 wherein the solution of said nitrite ester is substantially water-free and substantially oxygen-free.

5. The process of claim 2 in which the organic nitrite ester is an aliphatic nitrite ester.

6. The process of claim 2 in which the organic nitrite ester is an aryl nitrite ester.

7. The process of claim 2 in which the organic nitrite ester is an alicyclic nitrite ester.

8. The process of claim 2 in which the organic nitrite ester is a heterocyclic nitrite ester.

9. The process of claim 2 in which the organic nitrite ester is a steroidal nitrite ester.

10. The process of claim 2 in which the organic nitrite ester is a steroid nitrite ester having 18 to 29 carbon atoms in the steroid moiety thereof, the nitrite radical of said nitrite ester being conformationally adjacent to a hydrogen atom, there being a 2-carbon bridge between the respective carbon atoms bearing the nitrite ester and the conformationally adjacent hydrogen atom, said nitrite ester being in a position selected from the group consisting of 1β-, 2β-, 4β-, 6β-, 7β-, 11α-, 11β-, 15α-, 18-, 19-, 20α-, 20β-, and the 24-positions.

11. A process according to claim 1 wherein Y is halogen, said process comprising converting a hypohalite ester of an organic compound, said hypohalite ester having a hypohalite radical and additionally having at least six carbon atoms and an atom selected from the group consisting of carbon, oxygen, sulfur, and nitrogen, said hypohalite ester including an arrangement of atoms represented by the following diagram:

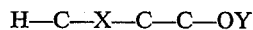

wherein Y is a halogen and OY is a hypohalite radical, H is a reactive hydrogen conformationally adjacent to said hypohalite radical, and X is an atom selected from the group consisting of carbon, nitrogen, sulfur, and oxygen; which comprises irradiating a solution of said hypohalite ester to ultraviolet radiation having a band of radiation approximately that absorbed by said hypohalite radical and, in said hypohalite ester thus irradiated, photolytically exchanging said reactive hydrogen with the halogen, Y, in said hypohalite radical.

12. A process according to claim 11 wherein said hypohalite ester is a hypochlorite ester and wherein, upon irradiation with ultraviolet light said reactive hydrogen is photolytically exchanged with the chlorine in said hypochlorite radical.

13. A process which comprises preparing a nitrite ester of an organic compound, said nitrite ester having a nitrite radical and additionally at least six carbon atoms and a member of the group consisting of oxygen, sulfur, nitrogen and carbon, said nitrite ester including an arrangement of atoms represented by the following diagram:

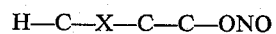

wherein ONO is a nitrite radical, H is a reactive hydrogen conformationally adjacent to said nitrite radical, and X is a member selected from the group consisting of oxygen, sulfur, nitrogen, and carbon; photolytically activating said nitrite ester in a solution and photolytically exchanging the NO group in said nitrite radical with said reactive hydrogen within said ester grouping.

14. The process which comprises reacting a nitrosyl halide with a solution of a hydroxy-organic compound in a nonpolar solvent, said hydroxy compound having a hydroxyl group and additionally at least six carbon atoms and an atom selected from the group consisting of O, S, N, and C, and possessing an arrangement of atoms represented by the following diagram:

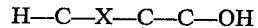

wherein H is a reactive hydrogen, OH is conformationally adjacent to the reactive hydrogen and X is a member of the group consisting of O, S, N, and C, whereby is formed a nitrite ester of said hydroxy compound; irradiating the solution with a band of ultraviolet radiation including an absorption band of the nitrite radical; and recovering the photolytic exchange product thereby produced.

15. A process of converting an organic nitrite which comprises irradiating by ultraviolet light a solution of a nitrite ester having a nitrite radical and additionally at least six carbon atoms and an atom selected from the group consisting of S, O, N, and C; photolytically including an arrangement of atoms represented by the following diagram:

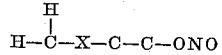

wherein ONO is a nitrite radical, at least one of the H atoms is a reactive hydrogen conformationally adjacent to the nitrite radical, and X is a member selected from the group consisting of S, O, N, and C; photolytically exchanging the NO group in said nitrite radical with said reactive hydrogen, and in the photolytic exchange product thereby produced, optionally converting any nitroso compound to the isomeric oxime derivative.

16. The process for preparing a halohydrin which comprises homolytically rearranging an alkyl hypohalite having at least one hydrogen on a carbon delta to the hypohalite group by exposure of the hypohalite to ultraviolet light.

References Cited by the Examiner
UNITED STATES PATENTS

| | | | |
|---|---|---|---|
| 2,674,606 | 4/1954 | Levin et al. | 260—397.45 |
| 2,675,402 | 4/1954 | Englund | 204—158 |
| 2,773,080 | 12/1956 | Bernstein et al. | 260—397.45 |
| 2,818,380 | 12/1957 | Welz | 204—158 |
| 2,885,333 | 5/1959 | Mueller et al. | 204—158 |

JOHN H. MACK, *Primary Examiner.*

LESLIE H. GASTON, JOHN R. SPECK, *Examiners.*

M. L. WILLIAMS, H. S. WILLIAMS,
*Assistant Examiners.*

UNITED STATES PATENT OFFICE
CERTIFICATE OF CORRECTION

Patent No. 3,298,941                      January 17, 1967

Derek H. R. Barton

It is hereby certified that error appears in the above numbered patent requiring correction and that the said Letters Patent should read as corrected below.

Column 2, line 58, for "smaller" read -- small --; column 5, line 40, for "0b." read -- 10b. --; column 11, line 30, for "that" read -- than --; line 66, for "minuts" read -- minutes --; column 15, line 47, after "various" insert -- other --; columns 15 and 16, in the table, last column, line 10 thereof, for "21-acetate (rxe" read -- 21-acetate (rx --; column 20, line 38, for "successively amounts of" read -- successively eluted with --; column 21, line 69, for "active oxide" read -- active oxido --; column 24, lines 58 to 60, strike out "photolytically ex- including an arrangement of atoms represented by the following diagram" and insert instead -- said nitrite ester including an arrangement of atoms represented by the following diagram --.

Signed and sealed this 25th day of June 1968.

(SEAL)
Attest:

EDWARD M. FLETCHER, JR.                        EDWARD J. BRENNER
Attesting Officer                             Commissioner of Patents